US008358605B2

United States Patent
Youn et al.

(10) Patent No.: US 8,358,605 B2
(45) Date of Patent: Jan. 22, 2013

(54) METHOD OF TRANSMITTING AND RECEIVING CHANNEL QUALITY IDENTIFIER FOR SLEEP MODE MOBILE STATION

(75) Inventors: Ae Ran Youn, Anyang-Si (KR); Jin Young Chun, Anyang-Si (KR); Jin Soo Choi, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/675,263

(22) PCT Filed: Sep. 4, 2008

(86) PCT No.: PCT/KR2008/005223
§ 371 (c)(1),
(2), (4) Date: Feb. 25, 2010

(87) PCT Pub. No.: WO2009/035232
PCT Pub. Date: Mar. 19, 2009

(65) Prior Publication Data
US 2010/0254291 A1   Oct. 7, 2010

(30) Foreign Application Priority Data
Sep. 13, 2007   (KR) .......................... 10-2007-0093080

(51) Int. Cl.
*G08C 17/00*   (2006.01)

(52) U.S. Cl. ...................... 370/311; 340/7.33; 455/343.3
(58) Field of Classification Search ...................... None
See application file for complete search history.

(56) References Cited

U.S. PATENT DOCUMENTS

| 7,269,145 | B2 | 9/2007 | Koo et al. | |
| 2007/0132733 | A1* | 6/2007 | Ram | 345/163 |
| 2007/0286066 | A1* | 12/2007 | Zhang et al. | 370/208 |
| 2008/0045145 | A1* | 2/2008 | Nakatsugawa | 455/11.1 |

FOREIGN PATENT DOCUMENTS

| WO | WO-2005/065056 A2 | 7/2005 |
| WO | WO-2008/035905 A1 | 3/2008 |

OTHER PUBLICATIONS

Dr. Sassan Ahmadi ("Introduction to Mobile WiMAX Radio Access Technology: PHY and MAC Architecture", Intel Corporation, Dec. 7, 2006.*

* cited by examiner

*Primary Examiner* — Jianye Wu
(74) *Attorney, Agent, or Firm* — Birch, Stewart, Kolasch & Birch, LLP

(57) ABSTRACT

A method of transmitting and receiving a channel quality indicator (CQI) for a sleep-mode mobile station is disclosed. When data to be transmitted to the mobile station is present, the mobile station which is in a sleep mode is directed to transition to a normal mode and simultaneously a temporary CQI channel is allocated thereto. Thus the mobile station which has transitioned to the normal mode from the sleep mode efficiently transmits the CQI, and data applying a proper modulation and coding scheme can be transmitted.

5 Claims, 3 Drawing Sheets

METHOD OF TRANSMITTING AND RECEIVING CHANNEL QUALITY IDENTIFIER FOR SLEEP MODE MOBILE STATION

TECHNICAL FIELD

The present invention relates to a method of transmitting and receiving a channel quality indicator in a mobile communication system, and more particularly, to a method for a sleep-mode mobile station to effectively transmit a channel quality indicator and a method of allocating a channel quality identifier transmission channel.

BACKGROUND ART

A broadband wireless access system supports a sleep mode to minimize power consumption of a mobile station. The sleep mode is comprised of a sleep interval for preventing power consumption in an interval during which a mobile station does not communicate with a base station and a listening interval for receiving an indication of whether data traffic is present between sleep intervals from the base station.

The length of the listening interval is fixed by a sleep request message (e.g., "MOB_SLP-REQ" message) and a sleep response message (e.g., "MOB_SLP-RSP" message). During the listening interval, the mobile station receives indications as to whether downlink traffic of the mobile station is present and whether ranging for maintaining uplink (UL) communication and a proper downlink (DL) coding type according to signal quality should be performed, through a traffic indication message (e.g., "MOB_TRF-IND" message) transmitted in broadcast form from the base station.

Meanwhile, a channel quality indicator (CQI) reporting procedure of a sleep-mode mobile station is as follows.

The sleep-mode mobile station may report a CQI to a slot allocated through a CQI channel (CQICH) allocation information element (CQICH_Allocation_IE) during a normal mode according to a designated period, a report type, a feedback type, etc. Here, a stop CQI allocation flag of a sleep control message including the MOB_SLP-RSP message, a ranging response (RNG-RSP) message, a downlink sleep control extended subheader, etc. may indicate '1' and at this time, the mobile station stops reporting the CQI allocated through the CQICH_Allocation_IE.

When resource allocation for CQICH transmission is stopped as described above, if a sleep-mode mobile station of a broadband wireless access system recognizes that downlink traffic is present, the mobile station transmits a bandwidth request message for reporting the CQI to the base station using a contention-based random access method. In this case, if collision occurs during random access, a backoff process is implemented and thus transmission of the CQI is delayed. Accordingly, since the base station can not acquire information about a downlink channel state at a corresponding time point, the base station can not apply an accurate adaptive modulation and coding scheme to data transmitted to a corresponding mobile station.

Moreover, even though the mobile station periodically transmits the CQI, the same problem occurs if a time point when the mobile station recognizes that traffic is present does not coincide with a CQI reporting time point.

DISCLOSURE

Technical Problem

An object of the present invention devised to solve the problem lies in providing a method of causing a mobile station to efficiently transmit a CQI and of transmitting data by applying a proper adaptive modulation and coding scheme, when downlink traffic to be transmitted to a sleep-mode mobile station is present.

In an embodiment of the present invention, a method of allocating resources for transmitting a temporary CQICH is proposed. Especially, cases where the resources for transmitting the temporary CQICH are allocated are specified.

In another embodiment of the present invention, an improved structure of a traffic indication message (i.e., MOB_TRF-IND message) for resource allocation for transmission of the temporary CQICH and a structure of a temporary CQICH allocation information element are provided.

Technical Solution

The object of the present invention can be achieved by providing a method for a base station to receive a channel quality indicator (CQI) from a mobile station. The method includes, directing a mobile station which is in a sleep mode to transit to a normal mode when data to be transmitted to the mobile station is present, allocating a temporary channel quality indicator channel (CQICH) to the mobile station, and receiving a CQI from the mobile station through the temporary CQICH.

When the mobile station is set to transmit the CQI at given periods during the sleep mode, the allocating a temporary CQICH may be performed when a difference between a time corresponding to a period set to transmit the CQI and a time when data to be transmitted to the mobile station is generated is greater than a prescribed threshold value. And, the allocating a temporary CQICH may be performed when the allocation of a CQICH is cancelled through a sleep control message during the sleep mode of the mobile station.

The temporary CQICH may be allocated to a region which is not used in a fast feedback channel when allocating the temporary CQICH is performed. The temporary CQICH may be allocated by a temporary CQICH allocation information element, and the temporary CQICH allocation information element may include at least one of allocation offset information, frame offset information, transmission period information, and transmission duration information.

In another aspect of the present invention, provided herein is a method for a mobile station which is in a sleep mode to transmit a channel quality identifier (CQI) to a base station. The method includes transitioning to a normal mode from the sleep mode upon receipt of a command from a base station, and transmitting the CQI through a temporary channel quality identifier channel (CQICH) allocated from the base station.

The command from the base station may be received when data to be transmitted to the mobile station is present.

Advantageous Effects

According to the present invention, when downlink traffic to be transmitted to a sleep-mode mobile station is present, the mobile station efficiently transmits a CQI and thus a base station can transmit data applying a proper adaptive modulation and coding scheme.

In addition, since when resources for transmitting a temporary CQI are to be allocated is specified, setting for efficiently transmitting a CQI can be performed.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. For example, the following description is given by way of example of a broadband wireless access system, specifically an IEEE 802 series system, but may be applied to any communication systems supporting a power saving mode of a mobile station.

The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The present invention provides a method of causing a mobile station to efficiently transmit a CQI and of transmitting data by applying a proper adaptive modulation and coding scheme, when downlink traffic to be transmitted to a sleep-mode mobile station is present. To this end, a method for a sleep-mode mobile station to transmit a CQI in a general broadband wireless access system and a method of processing data when downlink traffic to be transmitted to the sleep-mode mobile station is present are described in detail.

Figure 1:
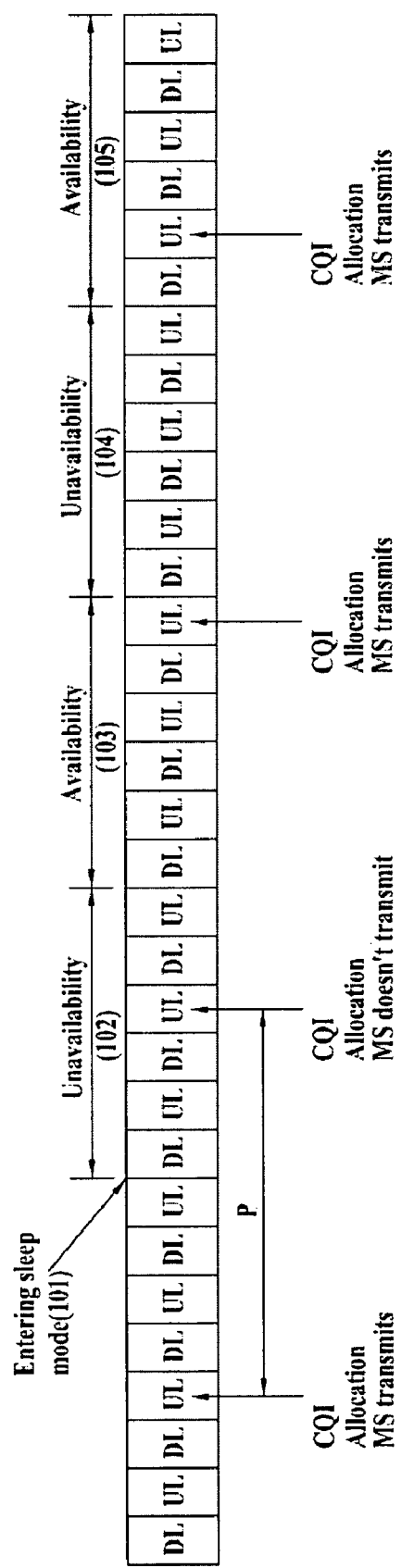
FIG. 1 is a diagram illustrating an example of periodically transmitting a CQI by a sleep-mode mobile station in a broadband wireless communication system (IEEE 802.16e system)

FIG. 1 is a diagram illustrating an example of periodically transmitting a CQI by a sleep-mode mobile station in a broadband wireless communication system (IEEE 802.16e system).

As mentioned above, the sleep-mode mobile station may report a CQI to a slot allocated through a CQICH allocation IE during a normal mode according to a designated period, a report type, a feedback type, etc. Referring to FIG. 1, the mobile station may attempt to transmit a CQI at a period P before entering a sleep mode 101. After entering the sleep mode, the mobile station has intervals (e.g., 103 and 105) during which a CQI report is available and intervals (e.g., 102 and 104) during which a CQI reporting is unavailable. In the interval during which a CQI report is unavailable, the mobile station does not transmit the CQI even at the CQI reporting period as illustrated in FIG. 1.

Meanwhile, a method of processing data when downlink traffic to be transmitted to the sleep-mode mobile station is present in a general broadband wireless communication system will be described below.

Figure 2:
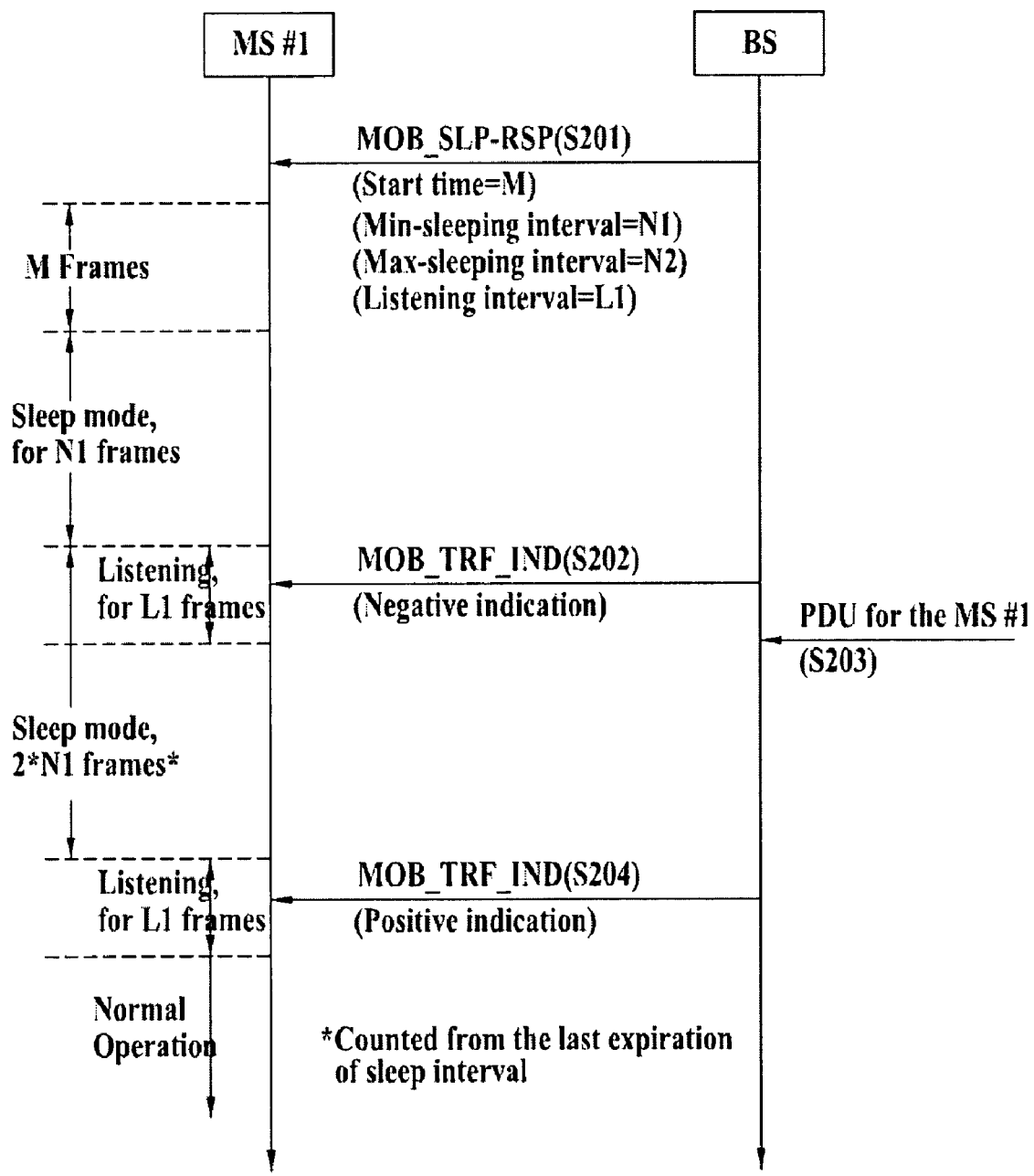
FIG. 2 is a flow diagram illustrating a processing procedure when downlink traffic to be transmitted to a sleep-mode mobile station is generated in a broadband wireless communication system (IEEE 802.16e system)

FIG. 2 is a flow diagram illustrating a processing procedure when downlink traffic to be transmitted to a sleep-mode mobile station is generated in a broadband wireless communication system (IEEE 802.16e system).

Referring to FIG. 2, a serving base station BS transmits a MOB_SLP-RSP message to a first mobile station MS#1 in step S201. The MOB_SLP-RSP message is a sleep response message, including sleep mode start time information (in FIG. 2, after M frames) of the mobile station MS#1, minimum sleep interval length information (N1 frames), maximum sleep interval length information (N2 frames), and a listening interval length information (L1 frames). Therefore, the mobile station is in a sleep mode starting from after M frames for at least N1 frames.

Next, the base station transmits a MOB_TRF-IND message to the mobile station during a listening interval of the mobile station to indicate whether traffic to be transmitted to a corresponding mobile station is generated in step S202. In step S202, if the base station indicates that no traffic to be transmitted to the mobile station is generated through a negative indication, the mobile station enters the sleep mode for at least (2×N1) frames. The (2×N1) frames are the number of frames calculated from the expiration of the previous sleep mode as illustrated in FIG. 1.

Meanwhile, while the mobile station is in the sleep mode, the base station may include data (i.e., PDU for the MS#1) to be transmitted to the mobile station in step S203. Then the base station may inform the mobile station that traffic to be transmitted to the mobile station has been generated through a MOB_TRF-IND message. That is, the base station transmits a positive indication to the mobile station in a next listening interval in step S204. The mobile station, which has received the positive indication through the MOB_TRF-IND message, transitions to a normal mode so as to be ready to receive corresponding data.

In order for the mobile station which has transitioned to a normal mode to efficiently receive data according to a proper adaptive modulation and coding scheme, the base station should recognize downlink channel information at a corresponding time point. However, a resource for transmission of a CQICH, which is additionally allocated for CQI report by the mobile station, may be not present around a time for transmitting data to the mobile station which has transitioned to the normal mode from the sleep mode.

More specifically, even if the mobile station periodically transmits a CQI during the sleep mode as described in FIG. 1, there may be a long interval between a time point when the mobile station recognizes whether traffic is present and a time point corresponding to a setting period for a CQI report. In this case, if the base station transmits data after receiving a CQI report at a corresponding period from the mobile station while the base station waits for the CQI report until a time corresponding to a CQI transmission period, data transmission may be delayed beyond a threshold permitted by a system. Conversely, if the base station transmits data to the mobile station without receiving a CQI report for a downlink from the mobile station, the base station can not apply a proper modulation and coding scheme. The threshold may be appropriately set according to a transmission delay degree permitted in the system.

On the other hand, a resource for transmitting a CQICH allocated through a CQI allocation IE may be cancelled through a sleep control message during a sleep mode of the mobile station. Namely, while the mobile station is in a sleep mode, the mobile station may receive a sleep control message, including a MOB_SLP-RSP message, a ranging response message, and a downlink sleep control enlarged subheader, in a state indicating that a stop CQI allocation flag is 1. If the resource allocation for CQICH transmission is stopped, the mobile station transmits a bandwidth request message to the base station using a contention-based access method to report a CQI. In this case, if collision occurs in random access, a backoff process is implemented and thus transmission of the CQI is delayed.

Therefore, one embodiment of the present invention provides a mechanism for a sleep-mode mobile station to efficiently report a CQI. That is, when data is to be transmitted to the sleep-mode mobile station from a base station, the base station directs the mobile station to transition to a normal mode and allocates resources for transmitting a temporary CQICH to the mobile station, thereby rapidly transmitting the CQI. Thereafter, the base station transmits data to the mobile station by applying an adaptive modulation and channel coding scheme based on the CQI. Thus since the mobile station, which has transitioned to a normal mode from a sleep mode, rapidly transmits the CQI, the data can be transmitted to a corresponding mobile station through a proper modulation and coding scheme without delay.

Such a method according to an embodiment of the present invention is described with reference to FIG. 3.

Figure 3:
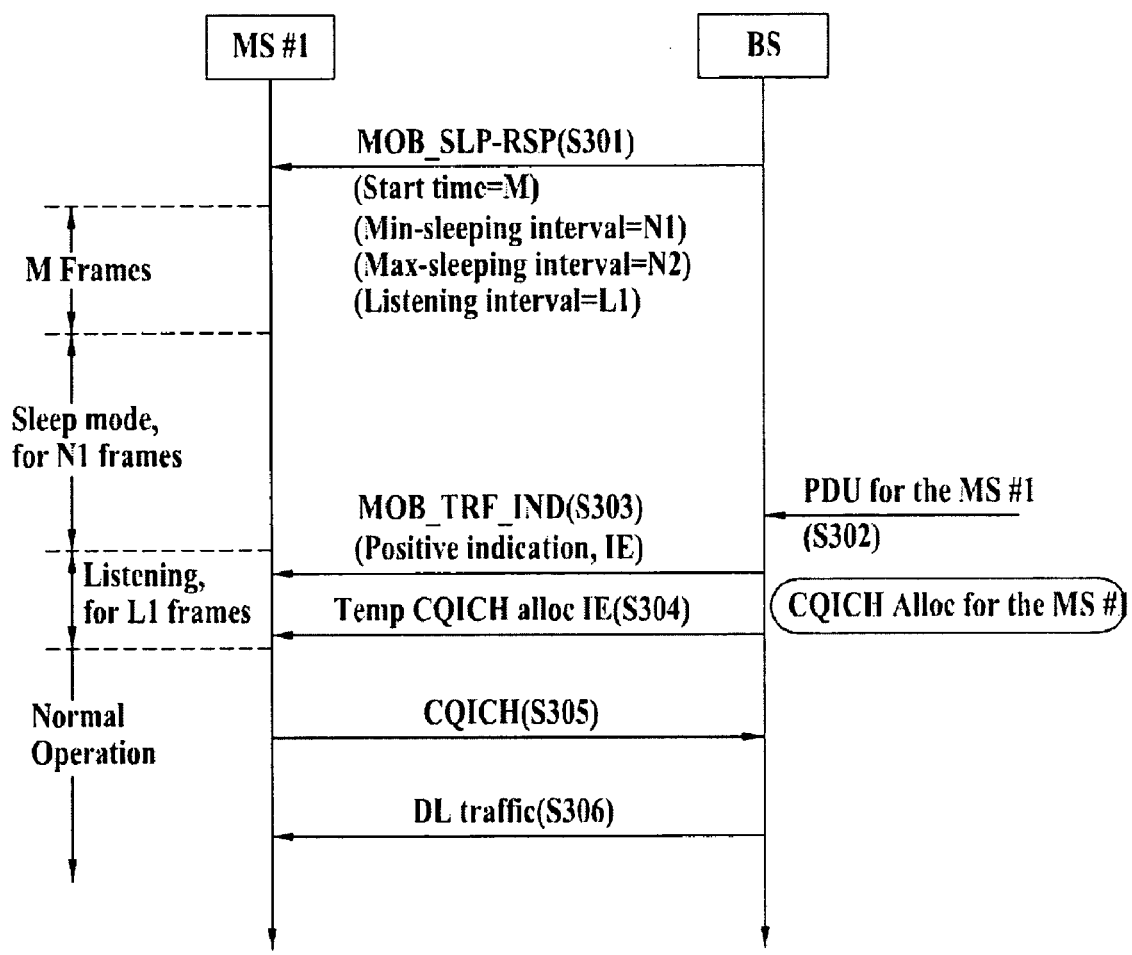
FIG. 3 is a flow diagram illustrating a processing procedure when data to be transmitted to a sleep-mode mobile station is generated according to an embodiment of the present invention.

FIG. 3 is a flow diagram illustrating a processing procedure when data to be transmitted to a sleep-mode mobile station is generated according to an embodiment of the present invention.

In FIG. 3, processes prior to step S303 are similar to the processes described in FIG. 2 and therefore a detailed description thereof is omitted. A mobile station MS#1, that has received a MOB_SLP-RSP message from a serving base station in step S301, enters a sleep mode and, during this sleep mode, data may occur to be transmitted to the mobile station from the base station in step S302.

If data to be transmitted to the mobile station is generated, the serving base station may indicate that data is to be transmitted to the mobile station by a positive indication through a MOB_TRF-IND message in step S303. The mobile station, which has received the MOB_TRF-IND message representing a positive indication, transitions to a normal mode.

The serving base station allocates a resource for transmitting a temporary CQICH to the mobile station in step S304, in additional to transmitting the MOB_TRF-IND message representing a positive indication in step S303. Allocating the resource for transmitting the temporary CQICH to the mobile station as in step S304 is desirably performed: (1) when an interval between a CQI reporting period of the mobile station and a time when the mobile station recognizes that data to be transmitted thereto is generated exceeds a given threshold in the case where the mobile station periodically transmits a CQI, and (2) when CQICH allocation setting allocated through a sleep control message to the mobile station is cancelled while the mobile station is in a sleep mode. In addition to the above cases, the resource for transmitting the temporary CQICH may be simultaneously allocated to mobile stations transitioning to a normal mode from a sleep mode and the resource allocation for the temporary CQICH is not limited to the above two cases. The resource for transmitting the temporary CQICH may temporally use a slot which is not used during a corresponding interval in a fast feedback channel. Furthermore, a detailed report type may use parameters defined in the latest CQICH allocation IE.

If the resource for transmitting the temporary CQICH is allocated to the mobile station in step S304, the mobile station transmits a CQI through the temporary CQICH in step 5305. Then the base station determines a modulation and coding scheme of corresponding data through the CQI received in step S305 and transmits data which is modulated and coded according to the determined modulation and coding scheme to the mobile station in step S306.

Meanwhile, an exemplary embodiment of the present invention provides an improved structure of a MOB_TRF-IND message to allocate a resource for transmitting the temporary CQICH to the mobile station which transitions to a normal mode from a sleep mode and provides a structure of a temporary CQICH_Allocation_IE.

A structure of a MOB_TRF-IND message proposed according to the exemplary embodiment of the present invention is as follows.

TABLE 1

| Syntax | Size | Notes |
|---|---|---|
| MOB_TRF-IND_Message_format( ) { | — | — |
| Management message type = 52 | 8 bits | — |
| FMT | 1 bit | — |
| if (FMT == 0) { | — | — |
| SLPID Group Indication bit-map | 32 bits | N-th bit of SLP ID-Group indication bit-map (MSB corresponds to N = 0) is allocated to SLPID Group that includes MS with SLPID values from N * 32 to N * 32 + 31. Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1. 32 bits of Traffic Indication Unit (starting from MSB) are allocated to MS in the ascending order of their SLPID values: 0: Negative indication 1: Positive indication |

TABLE 1-continued

| Syntax | Size | Notes |
|---|---|---|
| Num_Pos_Ind | 8 bits | Number of positive indications |
| for (i=0; i<Num_Pos_Ind; i++){ | | |
| Temp CQICH Allocation IE (A) | variable | |
| } | | |
| } else { | — | — |
| Num_Pos | 8 bits | Number of CIDs following |
| for (i=0; i<Num_Pos; i++) { | — | — |
| SLPIDs | 10 bits | — |
| Temp CQICH Allocation IE (B) | variable | — |
| } | | |
| } | — | — |
| Padding | variable | If needed, for alignment to byte boundary. |
| TLV encoded items | variable | — |
| } | — | — |

As indicated in Table 1, the MOB_TRF-IND message specifies a temporary CQICH allocation IE corresponding to the number of positive indications included in the MOB_TRF-IND message as can be appreciated by a parameter denoted by 'A'. Further, the temporary CQICH allocation IE corresponding to the number of the following connection identifiers (CIDs) is specified according to the positive indication as can be appreciated by a parameter denoted by 'B'.

When the MOB_TRF-IND message has the structure shown in Table 1, a structure of the temporary CQICH allocation IE is as follows.

TABLE 2

| Syntax | Size | Notes |
|---|---|---|
| Temp CQICH__Alloc_IE( ) { | — | — |
| Allocation offset | 6 bits | Index to the fast feedback channel region marked by UIUC = 0 |
| Frame offset | 3 bits | The MS starts reporting at the frame of which the number has the same 3 LSB as the specified frame offset. If the current frame is specified, the MS should start reporting in eight frames. |
| Period (p) | 2 bits | A CQI feedback is transmitted on the CQICH every $2^p$ frames. |
| Duration (d) | 3 bits | A CQI feedback is indexed by CQICH ID for $10^d$ frames and transmitted on the CQICH. If d = 0, the CQICH is deallocated. If d = 0b111, the MS (or SS) continues to report CQI until the BS directs the MS (or SS) to stop CQI report. |
| } | — | — |

As shown in Table 2, the temporary CQICH allocation IE may include at least one of allocation offset information, frame offset information, period information, and duration information. In more detail, the allocation offset information may indicate an index to a fast feedback channel region denoted by uplink interval usage code (UIUC)=0 based on an existing IEEE 802.16e system. However, specification for a corresponding UIUC may differ according to a system. A corresponding mobile station may be specified as starting reporting at a frame having the same number as 3 least significant bits (LSBs) specified as a frame offset according to the frame offset information. If a current frame is specified through a frame offset field, the mobile station should start reporting within but not limited to 8 frames.

The period information p included in the temporary CQICH allocation IE specifies that a CQI feedback is transmitted on the CQICH every $2^p$ frames. The duration information d indicates a duration during which the mobile station keeps a CQI report. In Table 2, the CQI feedback of the mobile station is indexed by CQICH_ID for $10^d$ frames and transmitted on the CQICH. If d=0, the CQICH is deallocated. If d=0b111, the mobile station should report the CQI until the base station directs the mobile station to stop the CQI report.

The structure of the MOB_TRF-IND message shown in Table 1 and the structure of the temporary CQICH_Allocation_IE shown in Table 2 are illustrative only and not intended to be limiting.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

For example, although the method for a sleep-mode mobile station to efficiently transmit a CQI in a broadband wireless communication system, specifically in an IEEE 802 series system, has been described, the present invention may be applied to any system as a method for a mobile station which has not set channel quality, that is, a mobile station which has not transmitted a report for a long time or which starts a report for the first time, to efficiently transmit a CQI. Furthermore, although a subject receiving a signal in a downlink has been described as a mobile station (MS), other terms such as 'mobile terminal', 'subscriber station (SS)', 'user equipment (UE)', etc. may be used. Similarly, although a subject transmitting a signal to a downlink has been described as a base station, other terms such as 'Node B', 'base transceiver station (BTS)' etc. may be used.

Accordingly, the invention should not be limited to the specific embodiments described herein, but should be accorded the broadest scope consistent with the principles and novel features disclosed herein.

[Industrial Applicability]

A method of allocating a resource for transmitting a temporary CQICH and a method of transmitting and receiving a CQI using the same are applied to an IEEE 802.16m system which is being developed to improve performance of a broadband wireless communication system and can overcome a shortcomings of an existing IEEE 802.16e system. When data to be transmitted to a mobile station which has not performed a report for a downlink channel state for a long time is generated, an efficient processing method can be applied to any communication systems supporting a power saving mode and requiring channel information for data transmission, as well as the IEEE 802 series communication system.

The invention claimed is:

1. A method of receiving a channel quality indicator (CQI) by a base station, the method comprising:
    transmitting a message to a mobile station which is in a sleep mode to transit to a normal mode, when data to be transmitted to the mobile station is present,
    wherein the message includes an indicator for indicating a number of the data to be transmitted to the mobile station;
    allocating a temporary channel quality indicator channel (CQICH) to the mobile station according to the indicator; and
    receiving a channel Quality indicator (CQI) from the mobile station through the temporary CQICH,
    wherein the allocating the temporary CQICH is performed when an interval between a first time and a second time is greater than a prescribed threshold value, the first time being a recent CQI reporting time in accordance with a CQI reporting period of the mobile station, the second time being a time when the data to be transmitted to the mobile station is generated.

2. The method according to claim 1, wherein said allocating the temporary CQICH is performed when the allocation of the CQICH is cancelled through a sleep control message during the sleep mode of the mobile station.

3. The method according to claim 1, wherein the temporary CQICH is allocated to a region which is not used in a fast feedback channel when said allocating the temporary CQICH is performed.

4. The method according to claim 1, wherein the temporary CQICH is allocated by a temporary CQICH allocation information element, and the temporary CQICH allocation information element includes at least one of allocation offset information, frame offset information, transmission period information, and transmission duration information.

5. A method of providing a channel quality indicator (CQI) by a mobile station, the method comprising:
    receiving a message from a base station directing the mobile station which is in a sleep mode to transit to a normal mode, when data to be transmitted to the mobile station is present in the base station,
    wherein the message includes an indicator for indicating a number of the data to be transmitted to the mobile station;
    receiving an allocation of a temporary channel quality indicator channel (CQICH) from the base station,
    wherein the allocation of the temporary CQICH is made according to the indicator; and
    transmitting a channel Quality indicator (CQI) to the base station through the temporary CQICH,
    wherein the allocation of the temporary CQICH is received when an interval between a first time and a second time is greater than a prescribed threshold value, the first time being a recent CQI reporting time in accordance with a CQI reporting period of the mobile station, the second time being a time when the data to be transmitted to the mobile station is generated by the base station.

* * * * *